(12) United States Patent
Guriappa Srinivas et al.

(10) Patent No.: US 8,997,215 B2
(45) Date of Patent: Mar. 31, 2015

(54) AUTHENTICATION USING MULTI-TIER MULTI-CLASS OBJECTS

(71) Applicant: Samsung Electronics Co., Ltd., Gyeonggi-do (KR)

(72) Inventors: Badrinath Guriappa Srinivas, Karnataka (IN); Shashi Bhanwar, New Delhi (IN); Shefali Singhal, Gujarat (IN); Debi Prosad Dogra, West Bengal (IN); Saurabh Tyagi, Uttar Pradesh (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/022,661

(22) Filed: Sep. 10, 2013

(65) Prior Publication Data

US 2014/0075552 A1 Mar. 13, 2014

(30) Foreign Application Priority Data

Sep. 10, 2012 (IN) ............................ 2806/DEL/2012
Aug. 6, 2013 (KR) ........................ 10-2013-0093017

(51) Int. Cl.
*G06F 15/16* (2006.01)
*G06F 21/36* (2013.01)

(52) U.S. Cl.
CPC ...................................... *G06F 21/36* (2013.01)
USPC .......... 726/19; 726/17; 726/22; 726/5; 726/7; 380/28; 380/30; 380/54

(58) Field of Classification Search
CPC ........................................................ G06F 21/36
USPC .............. 726/19, 22, 5, 7, 17; 380/30, 54, 28
See application file for complete search history.

(56) References Cited

U.S. PATENT DOCUMENTS

2006/0018467 A1* 1/2006 Steinmetz ....................... 380/54

FOREIGN PATENT DOCUMENTS

WO     WO 02065411 A2 *   8/2002

OTHER PUBLICATIONS

"Challenges in Gesture Recognition for Authentication Systems"—Clark et al, Rutgers Univ., Oct. 2011 http://gdclark.com/wp-content/uploads/2014/08/positionpaper.pdf.*

* cited by examiner

*Primary Examiner* — Randy Scott
(74) *Attorney, Agent, or Firm* — Cha & Reiter, LLC

(57) ABSTRACT

The invention provides a method and apparatus for authenticating a user in a touchscreen environment. A first tier may be defined having at least one object, and a destination tier may be defined having at least one bin. An authentication-key may be registered, the authentication-key comprising a length defining a number of nodes and a correct sequence of nodes, each node specifying a movement of one object from the first tier to one bin of the destination tier. A user sequence of at least one touchscreen gestures is received, each gesture specifying that one object from the first tier should be moved to one bin of the destination tier. Access is permitted if the at least one touchscreen gestures corresponds to the length, the correct sequence, and the movement of the authentication-key.

18 Claims, 7 Drawing Sheets

AUTHENTICATION USING MULTI-TIER MULTI-CLASS OBJECTS

CLAIM OF PRIORITY

This application claims priority under 35 U.S.C. §119(a) from Indian Patent Application Serial No. 2806/DEL/2012 filed in the Indian Patent Office on Sep. 10, 2012, the entire disclosure of which is incorporated by reference herein. This application also claims priority under 35 U.S.C. §119(a) to Korean Patent Application Serial No. 10-2013-0093017 filed in the Korean Intellectual Property Office on Aug. 6, 2013, the entire disclosure of which is hereby incorporated by reference.

BACKGROUND

1. Field of the Invention

The present disclosure relates to a touchscreen-enabled apparatus and a touchscreen-enabled gesture-based authentication method for improving the security of access-restricted computing devices.

2. Description of the Related Art

The portable nature of mobile computing devices, such as smartphones, tablet PCs and touch-enabled laptops, has necessitated the development of authentication mechanisms that prevent access to confidential information by denying unauthorized access. As a result, most mobile devices today include some form of authentication mechanism. While traditional systems were configured to utilize keypad input, the inclusion of touchscreen interfaces allows the authentication mechanisms to use touch, gesture and pattern-based input schemes to authenticate users and prevent unauthorized access to the device. More specifically, in a gesture-based authentication system, users may create a pre-defined "unlock" pattern that must be traced on the device screen, sometimes in relation to displayed visual elements. If the user-traced pattern matches with a pre-registered pattern, then the system may allow the user to access the device.

In another gesture-based authentication mechanism, a user is required to select an object displayed on the touchscreen only once. Thus, the user is restricted to repeatedly selecting the object in successive iterations. Authentication mechanisms such as these are deficient because the number of possible wrong combinations or challenge objects displayed on screen is not of sufficient complexity as to ensure the failure of unauthorized attempts to access the device. As a result, the security level achieved by such gesture or pattern-based authentication mechanisms is low as compared to conventional mechanisms that utilize alpha-numeric authentication (i.e.; passwords or key codes).

Increasing the complexity of gesture and pattern-based is further compounded by logistical difficulties introduced by the standard size of many mobile devices, such as smartphones. For example, in order to increase the challenge presented by a typical "unlock" pattern, the screen size of the device may have to be increased. This essentially limits the usefulness of this strategy for small screen devices. Moreover, the patterns employed by such strategies are usually simple enough that a potential unauthorized user who has observed the pattern will be able to gain unauthorized access to the mobile device. Similarly, in the object-based authentication mechanism, if the unauthorized user knows the number of objects to be selected in a pre-pattern, then the total number of trials and challenges presented to the unauthorized user is decreased, increasing the probability that the unauthorized user will gain access to the mobile device.

SUMMARY

In one aspect of the present disclosure, a method apparatus for authenticating a user in a touchscreen environment is provided. A first tier may be defined having at least one object, and a destination tier may be defined having at least one bin. An authentication-key may be registered, the authentication-key comprising a length defining a number of nodes and a correct sequence of nodes, each node specifying a movement of one object from the first tier to one bin of the destination tier. A user sequence of at least one touchscreen gestures is received, each gesture specifying that one object from the first tier should be moved to one bin of the destination tier. Access is permitted if the at least one touchscreen gestures corresponds to the length, the correct sequence, and the specified movement of the authentication-key.

In another aspect of the present disclosure, a touchscreen apparatus for authenticating a user is provided. The apparatus utilizes a computer process for executing program instructions, a touchscreen display for receiving touch-based user inputs, and computer readable medium carrying program instructions. The program instructions are executable to define a first tier having at least one object, and a destination tier having at least one bin. An authentication-key is registered, the authentication-key comprising a length defining a number of nodes and a correct sequence of nodes, each node specifying a movement of one object from the first tier to one bin of the destination tier. A user sequence is received of at least one touchscreen gestures, each gesture specifying that one object from the first tier should be moved to one bin of the destination tier. Access is allowed if the at least one touchscreen gestures corresponds to the length, the correct sequence, and the specified movement of the authentication-key.

DETAILED DESCRIPTION

Figure 1:
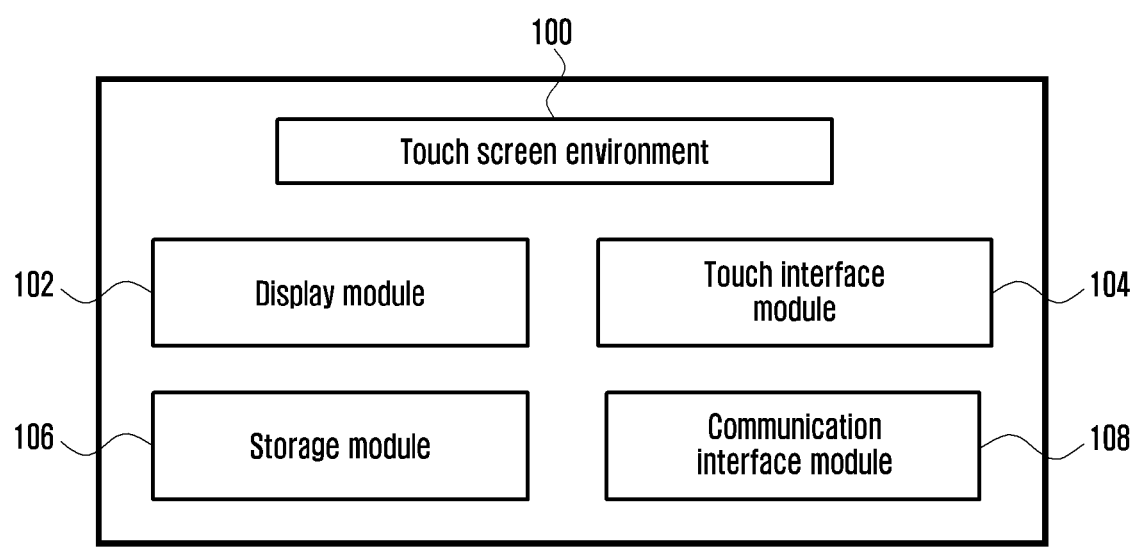
FIG. 1 is a block diagram illustrating a configuration of a mobile device touchscreen device with a number of modules, according to an embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and apparatus for gesture-based authentication using objects from multiple classes arranged in multiple tiers. The method enables a touchscreen device to display multiple objects. A user may select, drag, and drop the objects from a source tier objects to destination tier objects through one or more intermediate tier objects. The gesture-based authentication-key (also interchangeably referred to as a "password") is defined based on the number of objects selected, the sequence in which the objects are selected, and the pathways in which the objects are dragged and dropped through and to intermediary and destination tier objects. The method may allow selection of objects independently of previous iterations, thereby facilitating a very high rejection rate for unauthorized users attempting to gain access to the device. The method described herein exponentially increases the security level with a small increase in the number of objects necessary for implementation of any particular tier.

The present invention may be applied to a plurality of systems or applications including, but not limited to, other small-screen devices, defense systems, Automated Teller Machines (ATM), door security systems, or any other system that may benefit from the strategy presented herein. Because the method and system is reliant on display of graphical objects, it may be advantageously implemented on touchscreen environments that benefit from elevated degrees of security. Mobile devices, being portable, easily accessible and sometimes shared, may benefit heavily from the method and system described herein. Furthermore, this method and system are advantageously useable by a wide breadth of users, including literate users, illiterate users, or users who would otherwise have difficulty recalling or remembering alphanumeric passwords. Therefore, even children and children's devices may benefit from the higher degree of security afforded by the graphical gesture-based authentication method and system described herein. The method and system may also be adjustable, facilitate alteration of the security level of the authentication mechanism according to the users requirements. The user may increase or decrease the security level based on alteration of the number of objects and/or the intermediate and destination tiers, thereby altering the complexity of the authentication-key.

Throughout the description, the term "source tier" and "first tier" is used interchangeably. The term "destination tier" and "second tier" are used interchangeably. The term "gesture" and "pattern" are used interchangeably. The term "touchscreen device" and "touchscreen environment" are used interchangeably.

Referring now to the drawings (i.e.; FIGS. 1 through 7), where similar reference characters denote corresponding features consistently throughout the figures, these may be used to illustrate consistent features utilized across different embodiments of the present invention.

FIG. 1 is a block diagram illustrating a configuration of a mobile device touchscreen device or touchscreen environment 100 with a number of modules 104-108, according to an embodiment of the present invention. The touchscreen device 100 described herein may be configured to include a display module 102, a touch interface module 104, a storage module 106, and a communication interface module 108. The display module 102 of the touchscreen device 100 may be configured to display multiple objects across multiple classes and/or multiple tiers. This display module 102 preferably enables the user to select, drag, and drop the objects during the authentication process. The touch interface module 104 may be configured to extract gesture information based on user inputs to the touchscreen device 100. The storage module 106 may be computer memory space used to store multiple objects and registered authentication-keys. The storage module 106 may be implemented as internal memory, such as Random Access Memory (RAM), Read Only Memory (ROM), or external memory. The communication interface module 108 may be configured to provide a mechanism for the touchscreen device 100 to communicate with other external devices.

In one embodiment, the touchscreen device 100 described herein may implemented as a mobile phone, Personal Digital Assistant (PDA), personal computer, handheld device, portable electronic device, communicators, laptop, tablet PC, or any other device that utilizes a touchscreen input mechanism.

The authentication method for securing the touchscreen device 100 may involve two phases. The first phase is an authorization or registration phase, in which the authentication-key for authenticating users is learned and stored by the touchscreen device 100. In one embodiment, the authorization or registration phase may be defined as a process of configuring the touchscreen device 100 with a gesture or pattern of the user's choice, the gesture or pattern being defined by a number of relationships between objects manipulated by the user. The number of objects selected to create the gesture determines the authentication-key length, while the sequence and order of dragging objects from, to and through a number of intermediary and/or destination tier objects determines the components of the authentication-key. The aggregate authorized gesture forms the authentication-key. The second phase is the authentication or verification phase, where the user presents the authorized pattern to gain authorized access to the touchscreen device 100.

Figure 2:
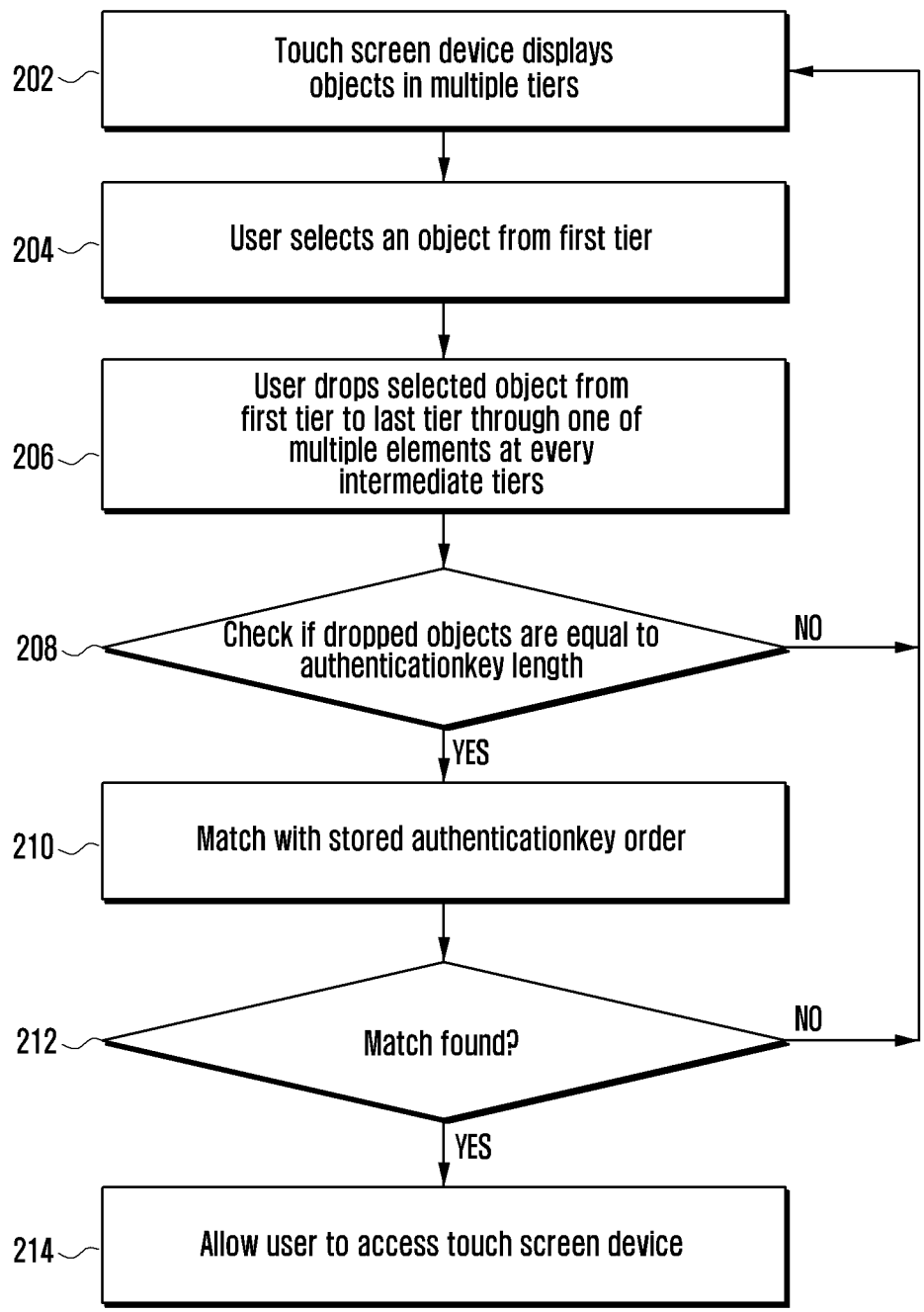
FIG. 2 is a flowchart illustrating a method for authenticating a user of the touchscreen device utilizing an authentication-key and multiple tiers, according to an embodiment of the present invention.

FIG. 2 is a flowchart illustrating one embodiment of the authentication or verification phase of the present invention, wherein a user of the touchscreen device 100 is authenticated utilizing an authentication-key and multiple destination tiers. At step 202, the touchscreen device 100 displays multiple objects in multiple tiers, the multiple tiers having at least a first tier, one or more intermediary tiers, and a destination tier. At each tier, there are a number of "objects" or "elements" displayed. At step 204, the user selects an object from the objects displayed in the first tier. At step 206, the user drags the selected object from the first tier to the destination tier, passing the selected object through a single object or element at each intermediary tier. In one embodiment, the method allows the touchscreen device 100 to display the multiple predefined intermediate tiers during the authorization process. In one embodiment, the path taken by the dropped object can be displayed visually on the display module 102, enabling the user to track the path the object has taken. The touchscreen device 100 preferably records the number of objects dragged and dropped from the first tier, the sequence of the dropped objects, and the path taken by the dragged and dropped object from the first tier, through the intermediary tiers, and down to the destination tiers.

At step 208, the touchscreen device 100 checks whether the number of objects dragged and dropped by the user matches the authentication-key length. If the number of objects does not match the authentication-key length, then the touchscreen device 100 continues to display the objects and tiers on the display module 102, enabling the user to complete the authentication sequence. If the number of objects does match the authentication-key length, then at step 210, the touchscreen device 200 may retrieve the sequence of dragged and dropped objects, and the path taken by each dragged and dropped object from the first tier, through intermediary tiers, down to the destination tiers, and compare the retrieved information to the stored authentication-key.

At step 212, if the stored authentication-key does not match the retrieved information, then access to the touchscreen device 100 is denied, and the steps 202-212 may be repeated. At step 214, if the stored authentication-key does match the retrieved information, the user is allowed to access the touchscreen device 100

It should be noted that various actions performed in the flowchart 200 may be performed in a different order than the order presented. Furthermore, in some embodiments, some actions listed in FIG. 2 may be omitted entirely, while other actions not presented may be included.

Figure 3:
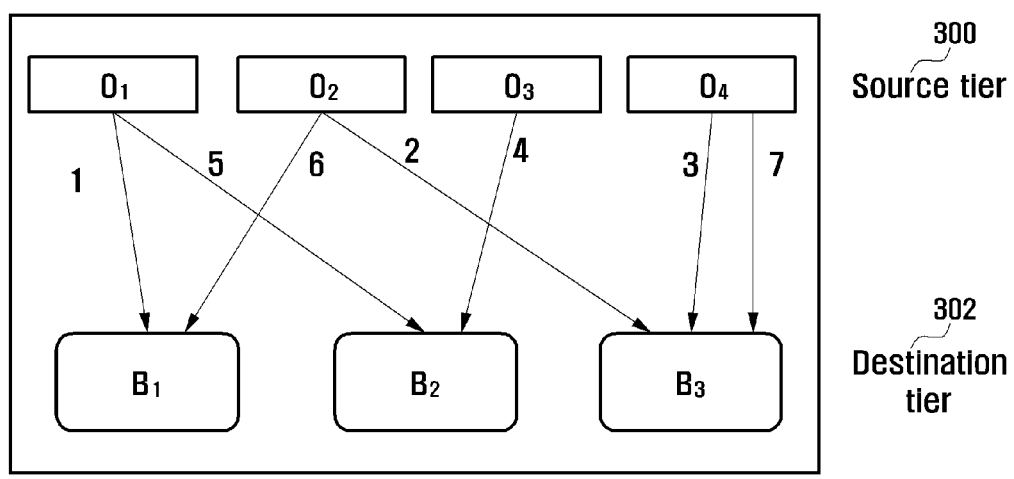
FIG. 3 is a block diagram illustrating an authentication-key utilizing two tiers, in accordance with an embodiment of the present invention.

FIG. 3 is a block diagram illustrating an authentication-key utilizing two tiers, in accordance with an embodiment of the present invention. The two-tiers described herein may include a source tier 300 and a destination tier 302 respectively. In one embodiment, the source tier 300 may include elements, $O_1$, $O_2$, $O_3$ and $O_4$ (referred to herein as "objects"), while the destination tier 302 may include elements $B_1$, $B_2$, $B_3$ (referred to herein as "bins").

Generally then, the source set O may include multiple elements α (objects) and destination set B can include multiple elements β (bins), and as such, may be described as follows in equations 1 and 2:

$$O = O_1, O_2, O_3, \ldots O_\alpha \qquad (1)$$

$$B = B_1, B_2, B_3, \ldots B_\beta \qquad (2)$$

In one embodiment, authorization of the touchscreen device 100 requires the user to drag and drop an object from the source set O into the bin of the destination set B. For example, the user may drag and drop an object $O_1$ from the source set O into the bin $B_1$. The user can repeat the process for different and/or subsequent objects. For each iteration, the selection of an object from the source set O, and the deposition of an object into a bin from the destination set B may be specific to the corresponding selection, and therefore independent from the previous iterations. Thus, the method enables the user to select the objects and deposit them in bins repeatedly. The sequence of selecting objects from the source set O ("i") and depositing them into particular bins of the destination set B ("j") may correspond to the authentication-key. Furthermore, the number of objects dropped from the source set O into the bins of the destination set B may provide the authentication key length ("L"). The objects of the source set O can be dropped into bins of destination set B based on the equation given below:

$$O_1 \mapsto B_1 \Leftrightarrow K_{1,1}^{1} \qquad (3)$$

$$O_2 \mapsto B_3 \Leftrightarrow K_{2,3}^{2} \qquad (4)$$

$$O_4 \mapsto B_3 \Leftrightarrow K_{4,3}^{3} \qquad (5)$$

$$\vdots \qquad (6)$$

$$O_2 \mapsto B_1 \Leftrightarrow K_{2,1}^{L} \qquad (7)$$

The symbol "→" represents the dropping of elements from the source set O to the destination set B. In one example, the $q^{th}$ iteration of dropping the source set element $O_i$ into the destination element $B_j$ may be represented as $K_{i,j}^{q}$. The sequential order $K_{1,1}^{1}, K_{3,3}^{2}, K_{4,3}^{3}, \ldots, K_{2,3}^{L}$ may define the authentication-key, where "L" is authentication-key length.

FIG. 3 explains the process of authentication using two tiers of the objects. In one embodiment, the source tier 300 may include four elements $O_1$, $O_2$, $O_3$, and $O_4$ (objects), and the destination tier 302 may include three elements $B_1$, $B_2$, and $B_3$ (bins). The correct number and sequence/order of objects dropped into the respective bins may constitute the authorized authentication-key. The sequence order as shown in FIG. 3 for authentication key length where "L"=7 is given in equations below $$O_1 \mapsto B_1 \Leftrightarrow K_{1,1}^{1} \qquad (8)$$

$$O_2 \mapsto B_3 \Leftrightarrow K_{2,3}^{3} \qquad (9)$$

$$O_4 \mapsto B_3 \Leftrightarrow K_{4,3}^{3} \qquad (10)$$

$$O_3 \mapsto B_2 \Leftrightarrow K_{3,2}^{4} \qquad (11)$$

$$O_1 \mapsto B_2 \Leftrightarrow K_{1,2}^{3} \qquad (12)$$

$$O_2 \mapsto B_1 \Leftrightarrow K_{2,1}^{6} \qquad (13)$$

$$O_4 \mapsto B_3 \Leftrightarrow K_{4,3}^{7} \qquad (14)$$

The equations 8-14 show actions that must be performed by the user during the authorization process, each equation corresponding to an iteration. During the first iteration (or equation 8), the object $O_1$ of the source tier 300 was dropped into the bin $B_1$ of the destination tier 302. During the second iteration, the object $O_2$ of the source tier 300 was dropped into the bin $B_3$ of the destination tier 302. During the third iteration, the object $O_4$ of the source tier 300 was dropped into the bin $B_3$ of the destination tier 302. During the fourth iteration, the object $O_3$ of the source tier 300 was dropped into the bin $B_2$ of the destination tier 302. During the fifth iteration, the object $O_1$ of the source tier 300 was dropped into the bin $B_2$ of the destination tier 302. During the sixth iteration, the object $O_2$ of the source tier 300 was dropped into the bin $B_1$ of the destination tier 302. During the seventh iteration, the object $O_4$ of the source tier 300 was dropped into the bin $B_3$ of the destination tier 302. In this example, therefore, the authentication-key length "L" is equal to seven, and the authentication-key may be defined as the sequence consisting of $K_{1,1}^{1}$, $K_{2,3}^{2}$, $K_{4,3}^{3}$, $K_{3,2}^{4}$, $K_{1,2}^{5}$, $K_{2,1}^{6}$, $K_{4,3}^{7}$.

In the present example, during the authentication process, the user drops the objects $O_1$, $O_2$, $O_3$, and $O_4$ of the source tier 300 into the bins $B_1$, $B_2$, and $B_3$ of the destination tier 302 in the same sequence as $K_{1,1}^{1}$, $K_{2,3}^{2}$, $K_{4,3}^{3}$, $K_{3,2}^{4}$, $K_{1,2}^{5}$, $K_{2,1}^{6}$, $K_{4,3}^{7}$, according to the authorized authentication-key. If the user fails to follow the authentication-key sequence order, then the user is preferably denied access to the touchscreen device 100. If the user successfully enters the correct authentication-key, both in terms of length, sequence, and path, then the user is preferably granted access to the touchscreen device 100.

In one embodiment, the objects or elements in the source set 300 and destination set 302 may be represented with fanciful or representative visual elements on the display module 102. For example, if the device is being used by children, elements in the source tier 300 may be displayed as different fruits, and the elements in the destination tier 302 may be baskets or boxes. In another example, the elements in the source tier 300 may include video clips (or a live video) of various sporting events, and the elements in the destination tier 302 may display the names of these sporting events. The user may then drop the selected video clip to the correct corresponding sporting event. In essence, the elements in the source tier 300 and the destination tier 302 may be any visual element desired, such as, but not limited toys, pets, cages, persons, characters, colors, symbols, etc., a combination thereof, or any other desired element. These elements may be stored in storage module 106 and available for display and selection in, for example, a selectable display gallery on the touchscreen device 100.

Figure 4:
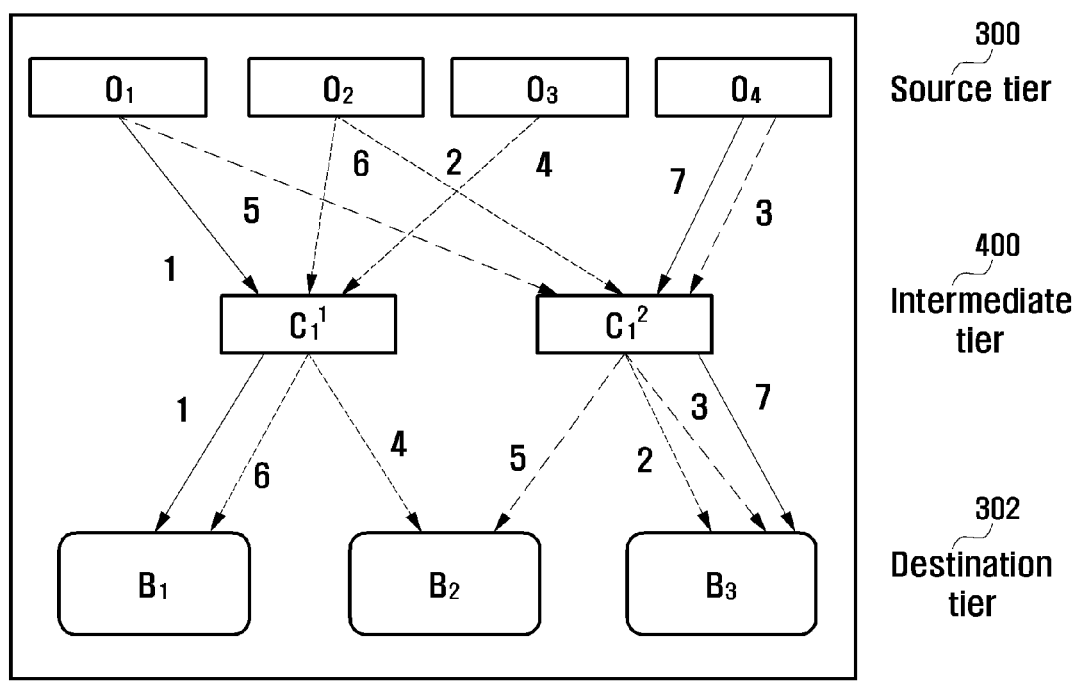
FIG. 4 is a block diagram illustrating an authentication-key utilizing one intermediate tier with channels, in accordance with an embodiment of the present invention.

FIG. 4 illustrates another embodiment of the present invention in which the authentication-key utilizes one intermediate tier 400 with "channels" $C_1$ and $C_2$. The inclusion of an intermediate tier 400 provides enhanced security to the touchscreen device 200 by requiring the usage of one or more intermediate tiers (such as channels $C_1, C_2, \ldots, C_\zeta$) between the source tier 300 and the destination tier 302, increasing the complexity of the authentication-key. As described above in the equations 1 and 2, the source set O and the destination set B may include multiple elements. Similarly, each intermediate tier may also include multiple channels. The inclusion of one or more intermediate tiers $C_1, C_2, \ldots, C_\zeta$ may utilize an indefinite number of channels, referred to as $\gamma, \delta, \ldots, \eta$ channels respectively, where $\tau \geq 0$ and $\gamma, \delta, \ldots, \eta > 1$.

The generic form of all the elements in all the tiers used by the method described herein during the authentication mechanism is as follows:

$$O = O_1, O_2, O_3 \ldots O_\alpha \quad (15)$$
$$\alpha > 0$$

$$C_1 = c_1^1, c_1^2, \ldots, c_1^\gamma \quad (16)$$
$$\gamma > 1$$

$$C_2 = c_2^1, c_2^2, \ldots, c_2^\delta \quad (17)$$
$$\delta > 1$$

$$\vdots = \vdots \quad (18)$$

$$C_\tau = c_\tau^1, c_\tau^2, \ldots, c_\tau^\eta \quad (19)$$
$$\eta > 1, \tau \geq 0$$

$$B = B_1, B_2, B_3, \ldots B_\beta \quad \beta > 0 \quad (20)$$

In one example, "L" represents the number of objects dropped from the source tier 300 to the bins in the destination tier 302 via one channel, and the sequence/order of dragging objects from the source tier, through channels of intermediary tiers 400, and dropping them into the bins of the destination tier 302 forms the authentication key. For example, the $q^{th}$ iteration of dropping the object $O_i$ from the source tier 300 into the bin $B_j$ of the destination tier 302 via channels $c_1^x, c_2^y, \ldots, c_\tau^z$ of the intermediate tiers 400, such as $1, 2, \ldots, \tau$ can be represented as $K_{i,1}^{q,x,y,\ldots,z}$, where $0 < i \leq u$, $0 < j \leq \beta$, $0 < x \leq \gamma$, $0 < y \leq \delta$ and $0 < z \leq \eta$.

In the present example, each of the selected objects $O_i$ of the source tier 300 may pass through one channel at each intermediate tier 400 before being dropped into one of the selected bins $B_j$ of the destination tier 302. The sequence/order of dropping the objects from the source set O to the destination set B may be represented as follows:

$$O_1 \mapsto c_1^{x1} \mapsto c_2^{y1} \ldots \mapsto c_\tau^{z1} \mapsto B_1) \Leftrightarrow K_{1,1}^{1,x1,y1,\ldots,z1} \quad (22)$$

$$O_2 \mapsto c_1^{x2} \mapsto c_2^{y2} \ldots \mapsto c_\tau^{z2} \mapsto B_3) \Leftrightarrow K_{1,1}^{1,x2,y2,\ldots,z2} \quad (23)$$

$$\vdots \quad (24)$$

$$O_2 \mapsto c_1^{x3} \mapsto c_2^{y3} \ldots \mapsto c_\tau^{z3} \mapsto B_1) \Leftrightarrow K_{2,1}^{L,x3,y3,\ldots,z3} \quad (25)$$

The symbol "$\mapsto$" represents the dropping of elements from one set to other.

In the generalized form, $c_i^k$ may be used to represent channel k at the intermediate tier i. The $q^{th}$ iteration of dropping a source set object $O_i$ into a destination bin $B_j$, through the channels $c_1^x, c_2^y, \ldots, c_\tau^z$ at the intermediate tiers $1, 2, \ldots \tau$, may be represented as $K_{i,j}^{q,x,y,\ldots,z}$. Therefore, the generalized sequence order representing an authentication key of length "L" may be given as:

$$K_{1,1}^{1,x1,y1,\ldots,z1}, K_{2,3}^{2,x2,y2,\ldots,z2}, \ldots, K_{2,1}^{L,x3,y3,\ldots,z3} \quad (26)$$

FIG. 4 shows the source tier 300, the destination tier 302, and a single intermediate tier 400. The intermediate tier 400 described herein may include two such channels $c_1^1$ and $c_1^2$. The user may attempt to access the touchscreen device 100 by dragging the objects from the source tier 300, through either channel of the intermediate tier 400 and dropping them into the bins of the destination tier 302. As described above, the user preferably manipulates the objects in a specific user-selected pattern, the number, sequence and pathway of such constituting the authentication-key. Therefore, in the present example, during the first iteration the user can drop the $O_1$ to $B_1$ through the ell, during the second iteration the user can drop the $O_2$ to $B_3$ through the $c_1^2$, during the third iteration the user can drop the $O_4$ to $B_3$ through the $c_1^2$, during the fourth iteration the user can drop the $O_3$ to $B_2$ through the $c_1^1$, during the fifth iteration the user can drop the $O_1$ to $B_2$ through the $c_1^2$, during the sixth iteration the can drop the $O_2$ to 131 through the $c_1^1$, and during the seventh iteration the user can drop the $O_4$ to $B_3$ through the $c_1^2$. In an example, the desired authentication-key could therefore have a length "L" equal to seven, and the authentication-key can be represented as $K_{1,1}^{1,1}, K_{2,3}^{2,2}, K_{4,3}^{3,2}, K_{3,2}^{4,1}, K_{1,2}^{5,1}, K_{2,1}^{6,1}, K_{4,3}^{7,2}$. As before, the sequence/order of dropping the objects should be same as the authentication-key. If the user fails to follow the defined sequence, then the user is denied access the touchscreen device 100.

Figure 5:
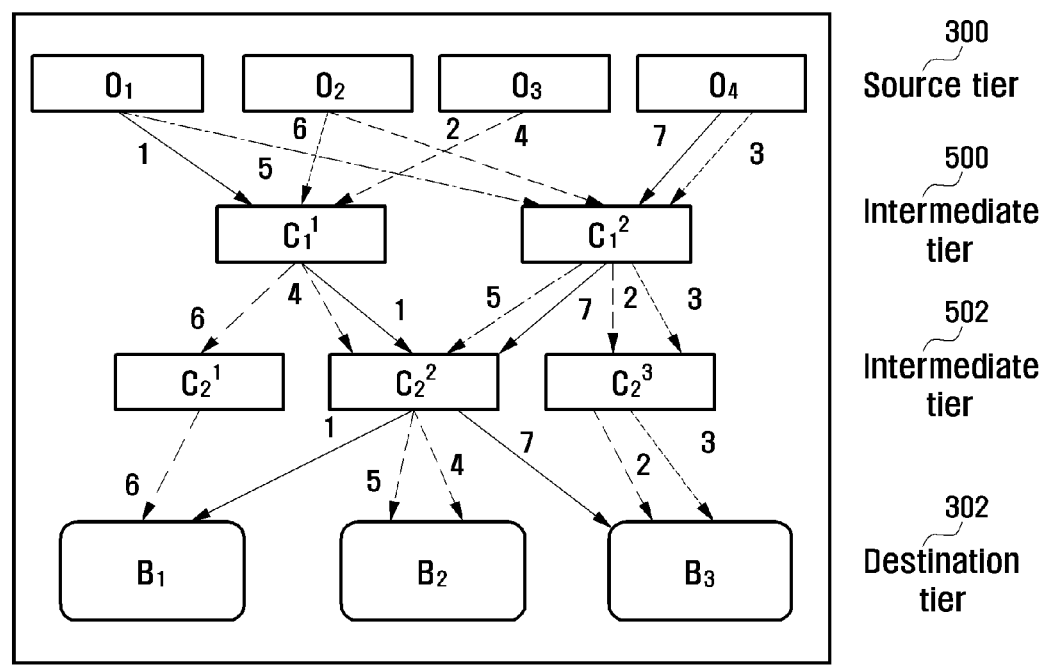
FIG. 5 is a block diagram illustrating an authentication-key utilizing two intermediate tiers with channels, in accordance with an embodiment of the present invention.

FIG. 5 is a block diagram illustrating an authentication-key utilizing two intermediate tiers 500 and 502 with channels, in accordance with an embodiment of the present invention. In this embodiment, and authentication-key requires use of a source tier 300, destination tier 302, and two intermediate tiers 500 and 502. The intermediate tiers are provided between the source tier 300 and the destination tier 302. In this example, the intermediate tier 500 may include two channels $c_1^1$ and $c_1^2$, and the intermediate tier 502 may include three channels $c_2^1, c_2^2$, and $c_2^3$. The user of the touchscreen device 100 is required to drag the objects from the source tier 300 through the channels of the intermediate tiers 500 and 502 and drop them into the bins of the destination tier 302, in a user-specific sequence. Therefore, the sequence shown in FIG. 5 gives the authentication-key of a length of seven, and can be represented by $K_{1,1}^{1,1,2}, K_{2,3}^{2,2,3}, K_{4,3}^{3,2,3}, K_{3,2}^{4,1,2}, K_{1,2}^{5,1,2}, K_{2,1}^{6,1,1}, K_{4,3}^{7,2,2}$.

Figure 6:
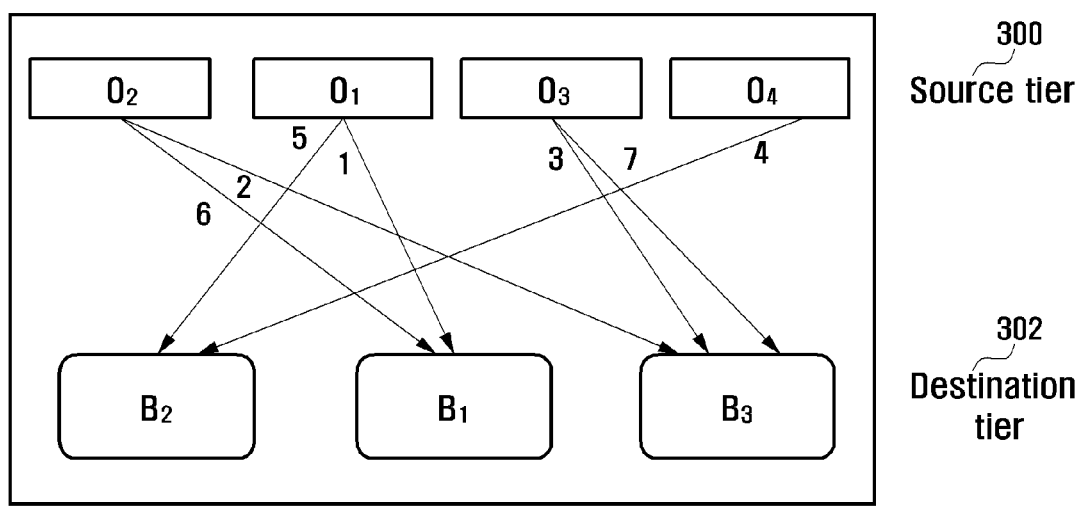
FIG. 6 is a block diagram illustrating an authentication-key utilizing randomly-ordered objects of both the source tier and the destination tier in accordance with an embodiment of the present invention.

FIG. 6 is a block diagram illustrating an authentication-key utilizing randomly-ordered objects of both the source tier and the destination tier in accordance with an embodiment of the present invention. In this example, the objects $O_2, O_1, O_3$, and $O_4$ of the source tier 300 and the bins $B_2, B_1$, and $B_3$ of the destination tier 302 are randomly arranged. Therefore, the order of objects of the source tier 300 is changed to $O_2, O_1, O_3$, and $O_4$ and the order of bins of the destination tier 302 is changed to $B_2, B_1$, and $B_3$. This random or shuffled arrangement of the objects and the bins can be done for every instance of the authentication, which should impede the efforts of an unauthorized user to access the touchscreen device 100 by (for example) observing and memorizing the pattern drawn on the touchscreen device 100 by an authorized user. Thus, even though the sequence/order of dropping the objects into the bins remains unchanged, the actual pattern required to unlock the touchscreen device 100 changes with every iteration, and will be known only to an authorized user.

In the present example, the authentication key created during the authorization process may include dropping the object $O_1$ of the source tier 300 into the bin $B_1$ of the destination tier 302 during the first iteration, dropping the object $O_2$ of the source tier 300 into the bin $B_3$ of the destination tier 302 during the second iteration, dropping the object $O_3$ of the source tier 300 into the bin $B_3$ of the destination tier 302 during the third iteration, dropping the object $O_4$ of the source tier 300 into the bin $B_2$ of the destination tier 302 during the fourth iteration, dropping the object $O_1$ of the source tier 300 into the bin $B_2$ of the destination tier 302 during the fifth iteration, dropping the object $O_2$ of the source tier 300 into the bin $B_1$ of the destination tier 302 during the sixth iteration, and dropping the object $O_3$ of the source tier 300 into the bin $B_3$ of the destination tier 302 during the seventh iteration. In an example, this seven iteration process defines an authentication-key length ("L") equal to seven, with the authentication-key represented as $K_{1,1}^1, K_{2,3}^2, K_{4,3}^3, K_{3,2}^4, K_{1,2}^5, K_{2,1}^6, K_{4,3}^7$.

In an example, the authentication key defined herein is same as defined in the FIG. 3, but the actual pattern traced by the user when dragging objects from source tier 300 into the bins of the destination tier 302 will differ considerably because of the randomization of the arrangement of objects in each tier. Therefore, an authorized user who mimics the observed pattern perfectly will be denied access to the touchscreen device 100. Thus, the method provides enhanced security to the touchscreen device 100 by randomly ordering the displayed objects, rather than having fixed or static display pattern for the objects in each respective tier.

In one embodiment, the user location may be known from applications such as a Global Positioning System (GPS), system time application, and a calendar/date application installed on the touchscreen device 100. Additionally, user profiles, social media, a map application, or other information sources may be used to determine the user's physical location. This information may be leveraged advantageously for use with the present invention. For example, the touchscreen device 100 may change the display or gallery set of objects for each tier based on the current location. Additionally, the user may authorize the use of different gallery sets depending on the time, date or physical location, adding more levels of security to the present invention.

In one embodiment, the touchscreen device 100 may add "empty" or "dummy" bins to the presented set of bins of the destination tier 302. Any objects from the source tier 300 dropped into the dummy bins may be either ignored or considered, based on the authorized user preferences. If a user notices that a potential unauthorized user is observing the user's attempt to access the touchscreen device 100, then the user may drop the objects into the dummy bin, which are preferably not considered, based on the authorized user preferences. The unauthorized user may later attempt to imitate the user's gesture, but their attempts at access may be confounded because the inclusion of the dummy bin complicates observation and recognition of the correct number, sequences and paths to recreate the authorization-key. In yet another embodiment, dummy objects may also be placed among the objects of the source tier 300. The dummy objects dragged and dropped from the source tier 300 into the true bins or dummy bins may also be ignored or considered, depending on the user's preferences. These dummy objects of the source tier 300 or the dummy bins of the destination tier 302 may thereby increase the security level by complicating observation of the correct authentication-key relative to static pattern-based authentication.

In another embodiment, the touchscreen device 100 may be configured to perform multiple authentication checks having different levels of security depending on the sensitivity of the requested function. For example, the user may have a low security level authentication check for unlocking the smart phone, but may include a high security level authentication check for access or manipulation of an important file or folder. The security level may be adjusted by increasing or decreasing the number of intermediate tiers, thereby allowing the user to allow any other person to access some functions of a (for example) smart phone without worrying about sensitive confidential information being disclosed.

Comparative analysis shows that the present invention is better secured relative to existing gesture-based authentication methods. The following evaluation metrics present mathematical analysis of the method as compared against the existing methods. The source tier 300 may be represented by the source set O, and the destination tier 302 may be represented by the destination set B, as in the equations 1 and 2. Source tier 300 and destination tier 302 have α and β objects respectively, wherein the intermediate tiers 1, 2, ... τ can include γ, δ, ... η channels respectively. The existing method includes only one set of objects, such as an alphabet set, so as to achieve a fair comparison. The summation of the number of elements from all the tiers may therefore include the source tier, the destination tier, and all the intermediate tiers, and analogized to an alphabet set having size χ where:

$$\chi = (\alpha + \beta + \gamma +, \ldots, +\eta) \qquad (27)$$

The metrics used for the comparison can be for example, Elimination Combinations (EC), Visual Eliminations (VE), and Effective Eliminations (EE).

The EC described herein may be defined as the number of wrong combinations or challenges or rejections that the system poses for the unauthorized user. A higher number of potential eliminations represents a greater degree of scrutiny. In the disclosed invention, for each iteration, the selection of the elements from the source, destination or intermediate tiers is independent of the corresponding selection from the previous iterations. The EC for authentication key of length L is therefore as given below:

$$EC = (\alpha \times \beta \times \gamma \times \delta, \ldots \eta)^L \qquad (28)$$

In the existing gesture-based authentication method, there exists a constraint that the selected object from the alphabet set χ could not be repeated. The existing system elimination combinations (PEC), for an authentication-key of length L is therefore:

$$PEC = \frac{\chi!}{(\chi - L)!} \qquad (29)$$

The VE described herein can be considered provided the unauthorized user has a chance to visually observe the authentication-key when the authorized user is authenticating the graphically secured touchscreen device 100. The unauthorized user may gain access to the touchscreen device 100 by providing the observed authentication pattern or gesture. The VE gives the total number of background variations to enter the authenticating pattern. The VE of the present invention is given below:

$$VE = \alpha! \times \beta! \times \gamma! \times \delta!, \ldots \eta! \quad (30)$$

Thus, the number of visual eliminations is constant, and is given by:

$$PVE = CONSTANT \quad (31)$$

The EE described herein gives the total number of rejections or the difficulties that the system poses for the unauthorized user due to elimination combinations and visual elimination. Since the elimination chances and visual eliminations are mutually dependent, the effective elimination of the unauthorized user for the proposed system (EE) is:

$$EE = EC \times VE \quad (32)$$

In contrast, the effective eliminations of the unauthorized user under the existing method (PEE) is given by:

$$PEE = PEC \times PVE \quad (33)$$

Mathematical analysis of the present invention (as derived from equations 28 and 29) shows that the elimination combination (EC) of the invention is exponential. In contrast, the existing system's elimination combinations (PEC) are factorial with respect to the authentication-key of length L. If the unauthorized user is aware of the length L of the authentication-key, then from equation 28, the proposed system poses $(\alpha! \times \beta! \times \gamma! \times \delta!, \ldots \eta!)^L$ elimination combinations. That is, the impostor being successful is $1 : (\alpha \times \beta \times \gamma \times \delta, \ldots, \eta)^L$, thereby allowing the user to repeatedly select an element in all the tiers. If the unauthorized user is not aware of the length L of the authentication key, then the proposed system poses:

$$EC = (\alpha \times \beta \times \gamma \times \delta, \ldots \eta)^\infty \quad (34)$$

number of elimination combinations. That is, the chances of the unauthorized user being successful are $1 : \infty$, which is very low. Equation 21 shows that the security of the proposed system is directly proportional to the number of elements in all the tiers such as the source tier $a$, the destination tier $\beta$, and the number of channels $\gamma, \delta, \ldots \eta$ at the intermediate tiers 1, 2, $\ldots \tau$, respectively. Hence, altering these parameters will alter the security level exponentially. Thus, a small increase in these parameters may affect a high level of security, especially relative to the existing method.

From equations 30 and 31, it is seen that the VE generated in the proposed system is the product of factorials of the number of elements in each tier, whereas in the existing system it is a constant. By increasing the number of elements in any of the multiple tiers by a small value, the VE generated increases significantly relative to the PVE generated by the existing system. Hence, it may be that the method addresses consistent visual attack by an unauthorized user far better than the existing system. The effective elimination is the product of the EC and VE.

Figure 7:
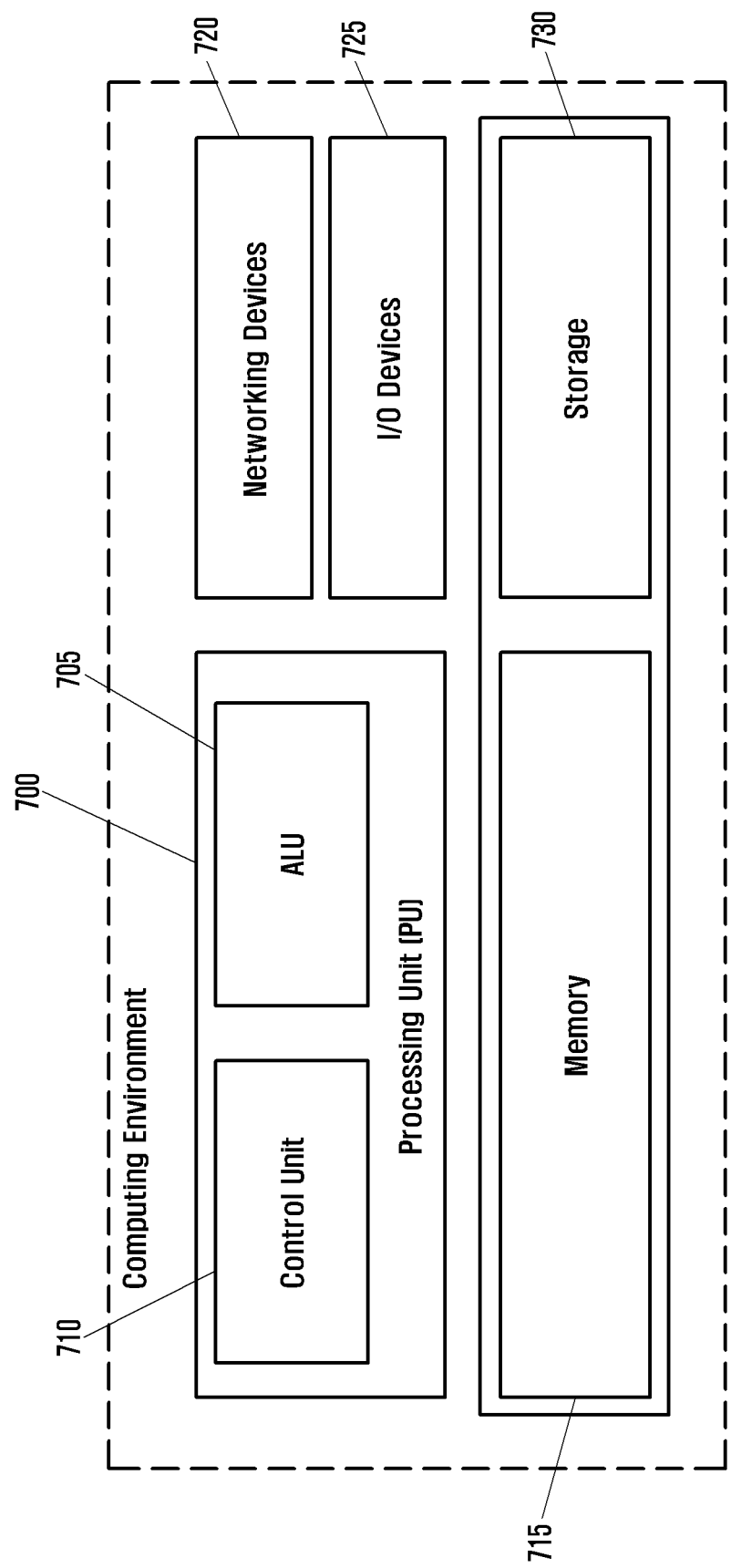
FIG. 7 a block diagram illustrating a computing environment implementing an embodiment of the present invention.

FIG. 7 is a block diagram illustrating a computing environment implementing an embodiment of the present invention. As depicted, the computing environment includes at least one processing unit 700 that is equipped with a control unit 710 and an Arithmetic Logic Unit (ALU) 705, a memory unit 715, a storage unit 730, plurality of networking devices 720, and a multiple input output (I/O) devices 725. The processing unit 700 is responsible for processing the instructions of the algorithm. The processing unit 700 receives commands from the control unit 710 in order to perform its processing. Further, any logical and arithmetic operations involved in the execution of the instructions are computed with the help of the ALU 705.

The overall computing environment can be composed of multiple homogeneous and/or heterogeneous cores, multiple CPUs of different kinds, special media and other accelerators. The processing unit 700 is responsible for processing the instructions of the algorithm. The processing unit 700 receives commands from the control unit 710 in order to perform its processing. Further, any logical and arithmetic operations involved in the execution of the instructions are computed with the help of the ALU 705. Furthermore, the plurality of process units may be located on a single chip or over multiple chips.

The embodiments disclosed herein can be implemented through at least one software program running on at least one hardware device and performing network management functions to control the elements. The elements shown in FIGS. 1 and 7 include blocks, which can be at least one of a hardware device, or a combination of hardware device and software module.

The apparatuses and methods of the disclosure can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed disclosure. Under the broadest reasonable interpretation, the appended claims constitute statutory subject matter in compliance with 35 U.S.C. §101.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for authenticating a user in a touchscreen environment, the method comprising:
 defining a first tier having at least one object, and a destination tier having at least one bin;
 registering an authentication-key, the authentication-key comprising a length defining a number of nodes and a correct sequence of nodes, each node specifying a movement of the at least one object from the first tier to the at least one bin of the destination tier;
 receiving a user sequence of at least one touchscreen gestures, each gesture specifying that the at least one object from the first tier is to be moved to the at least one bin of the destination tier; and
 allowing access if the user sequence corresponds to the length, the correct sequence, and the specified movement indicated for each node, of the authentication-key.

2. The method of claim 1, further comprising:
 defining one or more intermediary tiers, each intermediary tier having at least one channel;
 registering the authentication-key, each node further specifying the movement of the at least one object from the first tier to the at least one bin of the destination tier through a channel of each intermediary tier; and
 receiving the user sequence, each gesture moving the at least one object from the first tier through one channel of each intermediary tier to the at least one bin of the destination tier.

3. The method of claim 1, further comprising:
 displaying in a different order on a touchscreen the at least one object of the first tier for each iteration of the received user sequence.

4. The method of claim 3, further comprising:
 displaying in a different order on a touchscreen the at least one bin of the destination tier for each iteration of the received user sequence.

5. The method of claim 2, further comprising:
 displaying in a different order on a touchscreen the at least one channel of each intermediary tier for each iteration of the received user sequence.

6. The method of claim 1, further comprising:
 selecting from a gallery visual multimedia to represent the at least one objects and the at least one bin.

7. The method of claim 6, further comprising:
 automatically selecting from the gallery a pre-defined set of visual multimedia to represent the at least one objects and the at least one bins based on a current geographical position.

8. The method of claim 6, further comprising:
 automatically selecting from the gallery a pre-defined set of visual multimedia to represent the at least one objects and the at least one bins based on a current date and time.

9. The method of claim 1, further comprising:
 defining a dummy object and a dummy bin, a movement of the dummy object to a bin, and a movement of objects to the dummy bin having no effect with respect to a determination of whether the access is allowed.

10. An apparatus for authenticating a user, comprising:
 a processor for executing program instructions;
 a touchscreen display for receiving touch-based user inputs; and
 computer readable non-transitory medium carrying program instructions, the program instructions executable by the processor to:
  define a first tier having at least one object, and a destination tier having at least one bin,
  register an authentication-key, the authentication-key comprising a length defining a number of nodes and a correct sequence of nodes, each node specifying a movement of the at least one object from the first tier to the at least one bin of the destination tier,
  receive a user sequence of at least one touchscreen gestures, each gesture specifying that the at least one object from the first tier is to be moved to the at least one bin of the destination tier, and
  allow access if the user sequence corresponds to the length, the correct sequence, and the specified movement of each node of the authentication-key.

11. The apparatus of claim 10, the program instructions further comprising:
 defining one or more intermediary tiers, each intermediary tier having at least one channel;
 registering the authentication-key, each node further specifying the movement of the at least one object from the first tier to the at least one bin of the destination tier through a channel of each intermediary tier; and
 receiving the user sequence, each gesture moving the at least one object from the first tier through one channel of each intermediary tier to the at least one bin of the destination tier.

12. The apparatus of claim 10, the program instructions further comprising
 displaying in a different order on a touchscreen the at least one object of the first tier for each iteration of the received user sequence.

13. The apparatus of claim 11, the program instructions further comprising
 displaying in a different order on a touchscreen the at least one bin of the destination tier for each iteration of the received user sequence.

14. The apparatus of claim 12, the program instructions further comprising
 displaying in a different order on a touchscreen the at least one channel of each intermediary tier for each iteration of the received user sequence.

15. The apparatus of claim 10, the program instructions comprising
 selecting from a gallery visual multimedia to represent the at least one objects and the at least one bins.

16. The apparatus of claim 5, the program instructions further comprising
 automatically selecting from the gallery a pre-defined set of visual multimedia to represent the at least one objects and the at least one bins based on a current geographical position.

17. The apparatus of claim 15, the program instructions further comprising
 automatically selecting from the gallery a pre-defined set of visual multimedia to represent the at least one objects and the at least one bins based on a current date and time.

18. The apparatus of claim 10, the program instructions further comprising defining a dummy object and a dummy bin, a movement of the dummy object to a bin, and a movement of objects to the dummy bin having no effect with respect to a determination of whether the access is allowed.

* * * * *

UNITED STATES PATENT AND TRADEMARK OFFICE
CERTIFICATE OF CORRECTION

| | | |
|---|---|---|
| PATENT NO. | : 8,997,215 B2 | |
| APPLICATION NO. | : 14/022661 | |
| DATED | : March 31, 2015 | |
| INVENTOR(S) | : Badrinath Guriappa Srinivas et al. | |

It is certified that error appears in the above-identified patent and that said Letters Patent is hereby corrected as shown below:

In the Claims

Column 13, Claim 1, Line 20 should read as follows:
--...each node of the...--

Column 13, Claim 6, Line 46 should read as follows:
--...one object and the...--

Column 13, Claim 7, Lines 49-50 should read as follows:
--...one object and the...--

Column 13, Claim 7, Line 50 should read as follows:
--...one bin based on...--

Column 13, Claim 8, Lines 54-55 should read as follows:
--...one object and the...--

Column 13, Claim 8, Line 55 should read as follows:
--...one bin based on...--

Column 14, Claim 13, Line 35 should read as follows:
--...claim 12, the program...--

Column 14, Claim 14, Line 40 should read as follows:
--...claim 11, the program...--

Column 14, Claim 15, Lines 45-46 should read as follows:
--...program instructions further comprising...--

Signed and Sealed this
Seventh Day of July, 2015

Michelle K. Lee
*Director of the United States Patent and Trademark Office*

CERTIFICATE OF CORRECTION (continued)
U.S. Pat. No. 8,997,215 B2

Column 14, Claim 15, Line 48 should read as follows:
--...one object and the...--

Column 14, Claim 15, Line 48 should read as follows:
--...at least one bin...--

Column 14, Claim 16, Line 49 should read as follows:
--...claim 15, the program...--

Column 14, Claim 16, Lines 52-53 should read as follows:
--...one object and the...--

Column 14, Claim 16, Line 53 should read as follows:
--...one bin based on...--

Column 14, Claim 17, Lines 58-59 should read as follows:
--...one object and the...--

Column 14, Claim 17, Line 59 should read as follows:
--...one bin based on...--